United States Patent [19]
Blanvillain et al.

[11] Patent Number: 5,953,408
[45] Date of Patent: *Sep. 14, 1999

[54] TELEPHONE INCLUDING AN ELECTROMECHANICAL TRANSDUCER, METHOD OF ADAPTING THE FREQUENCY RESPONSE OF SUCH A TRANSDUCER AND METHOD OF CODING A MELODY

[75] Inventors: Xavier Blanvillain; Philippe Thauvin; Stéphane Pincon; Hean-Michel Simon, all of Le Mans, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,188
[22] Filed: Mar. 6, 1997
[30] Foreign Application Priority Data Mar. 13, 1996 [FR] France ..................................... 96 03155

[51] Int. Cl.⁶ ....................................................... H04M 1/00
[52] U.S. Cl. ............................................. 379/374; 379/373
[58] Field of Search ..................................... 379/374, 373, 379/375, 433

[56] References Cited

U.S. PATENT DOCUMENTS

| | | | |
|---|---|---|---|
| 4,598,179 | 7/1986 | Clark et al. | 179/84 |
| 4,731,828 | 3/1988 | Basehore | 379/382 |
| 4,866,766 | 9/1989 | Mitzlaff | 379/374 |

FOREIGN PATENT DOCUMENTS

| | | | |
|---|---|---|---|
| 0094162A2 | 11/1983 | European Pat. Off. | H04M 19/02 |
| 3127522 | 5/1991 | Japan | H04B 7/26 |
| 2091470 | 7/1982 | United Kingdom | G01H 1/00 |

*Primary Examiner*—Jack Chiang
*Attorney, Agent, or Firm*—Dicran Halajian

[57] ABSTRACT

A telephone is disclosed which includes a transducer and a controller. The transducer produces a sound having a level which varies as a function of the frequency and duty cycle of an excitation signal. The controller provides the excitation signal which has different frequencies, such as a coded melody. The controller varies the duty cycle so that the level of the sound from the transducer remains constant at the different frequencies. The telephone also includes a memory for storing values of the duty cycle corresponding to the different frequencies. These values allow the level of the sound to remain constant at the different frequencies. The controller codes the melody by storing in a table of the memory components of the melody, such as notes, silences, repetitions, the duration of each note or each silence, and a repetition number for melody components which are to be repeated. A time limit is also included in the table when the repetition number is infinite.

11 Claims, 5 Drawing Sheets

TELEPHONE INCLUDING AN ELECTROMECHANICAL TRANSDUCER, METHOD OF ADAPTING THE FREQUENCY RESPONSE OF SUCH A TRANSDUCER AND METHOD OF CODING A MELODY

BACKGROUND OF THE INVENTION

The present invention relates to a telephone including a controllable electromagnetic transducer which produces a variable sound level as a function of frequency, a method which permits of playing melodies on such a telephone, and a method of coding such melodies.

Telephones and notably mobile telephones require ringing tones which can be heard in a noisy environment. Moreover, these telephones are subjected to demanding constraints as regards to bulkiness (weight, volume) and supply voltage. To comply with all these constraints, one is led to use electromagnetic transducers (or buzzers) in such telephones, which transducers are provided for generating one-tone ringing sounds (or beeps) of a high sound level. By way of example, the frequency response of such an electromechanic transducer is shown in FIG. 2. This frequency response is very irregular, but a sound level of about 95 dB is obtained for a frequency of 2.703 kHz.

For improving the ease of use of de telephones, various musical melodies are proposed to the user so as to replace these conventional ringing sounds. For this purpose, U.S. Pat. No. 4,480,153 proposes the use of a musical apparatus which is connected to the telephone to play various musical melodies.

OBJECTS AND SUMMARY OF THE INVENTION

It is a first object of the present invention to manage to play melodies composed of a large variety of notes with the electromechanical transducers described in the preceding paragraphs which are currently included in telephones.

Therefore, a telephone according to the invention and as defined in the opening paragraph is characterized in that it comprises adapting means for adapting the frequency response of said transducer to obtain a constant sound level whatever the frequency under consideration.

The invention is notably applicable to the meld of mobile telephones.

In a particularly advantageous embodiment, said adapting means notably consist of causing the duty cycle of the excitation signal of said electromechanical transducer to vary.

And the telephone thus advantageously comprises storage means for storing for each frequency at least one value of the duty cycle of said excitation signal to obtain at least a given sound level on the output of the transducer.

It is another object of the present invention to propose an effective method of coding such a melody.

Therefore, a telephone as defined in the preceding paragraphs is characterized in that it comprises:

coding means for coding a melody, consisting of storing one or various component elements of said melody in a Table: notes, silences and, as appropriate, repetitions, reading means for reading a coded melody, consisting of sequentially passing through said Table from the start of said melody, and, as appropriate, effecting returns to play said repetitions.

Such a melody coding method may be implemented independently of the method described previously of playing melodies with the electromechanical transducers which are currently included in the commercial telephones.

In an advantageous embodiment, said Table contains for each repetition:

a number of repetitions, an indication relating to the elements to be repeated, a time limit, as appropriate, when said repetition number is infinite.

BRIEF DESCRIPTION OF THE DRAWINGS

These and other aspects of the invention are apparent from and will be elucidated with reference to the embodiments described hereinafter.

In the drawings:

In FIG. 1 is shown a telephone according to the invention. Such a telephone notably comprises an antenna 1, a loudspeaker/receiver 2, a display 3, a keypad 4, a microphone 5, an electromechanical transducer 6 which is connected to an output 7 of a microprocessor assembly 8.

DETAILED DESCRIPTION OF THE PREFERRED EMBODIMENT

In the embodiment which will now be described, the microprocessor assembly 8 is a microprocessor 91CL301 manufactured by PHILIPS (formed on the basis of an 68000 by Motorola). And the electromechanical transducer is an SBT 0905 RP transducer manufactured by SAMBU.

Figure 1:
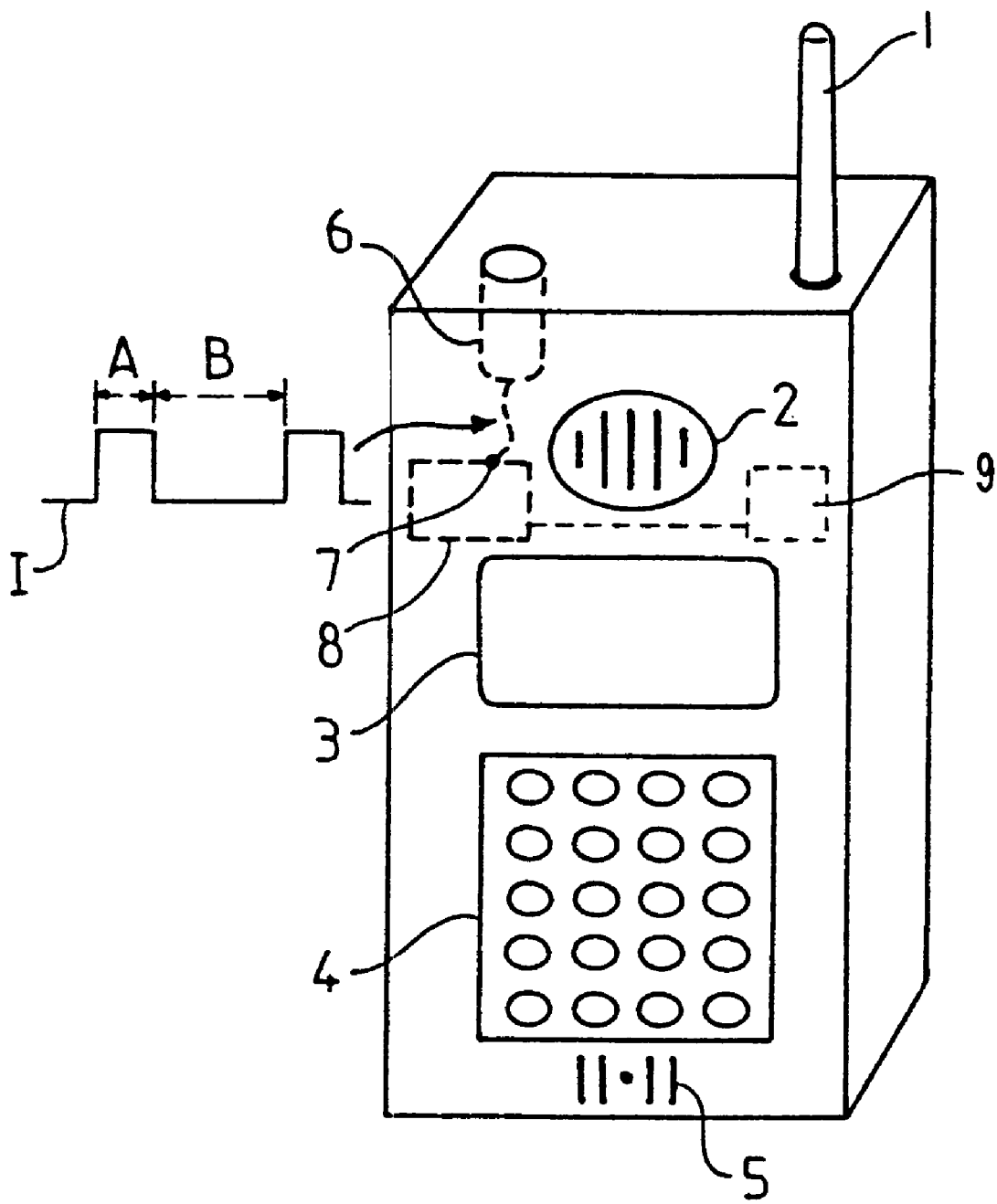
FIG. 1 represents an example of a telephone according to the invention.

The electomechanical transducer 6 is formed by a coil mounted around an air gap. A metallic membrane is positioned above the electromagnet formed in this manner. An excitation signal I (current) applied to the transducer causes the magnetic field to vary near to the membrane, thus causing it to oscillate at the frequency of said signal. The use of square-wave excitation signals makes it possible to obtain a maximum variation of the magnetic field. In FIG. 1 is shown the excitation signal I. Its duty cycle R is equal to A/A+B where A is the duration of the ascending edge and B that of the descending edge. The generation of these square-wave signals is ensured by the microprocessor assembly 8.

Figure 2:
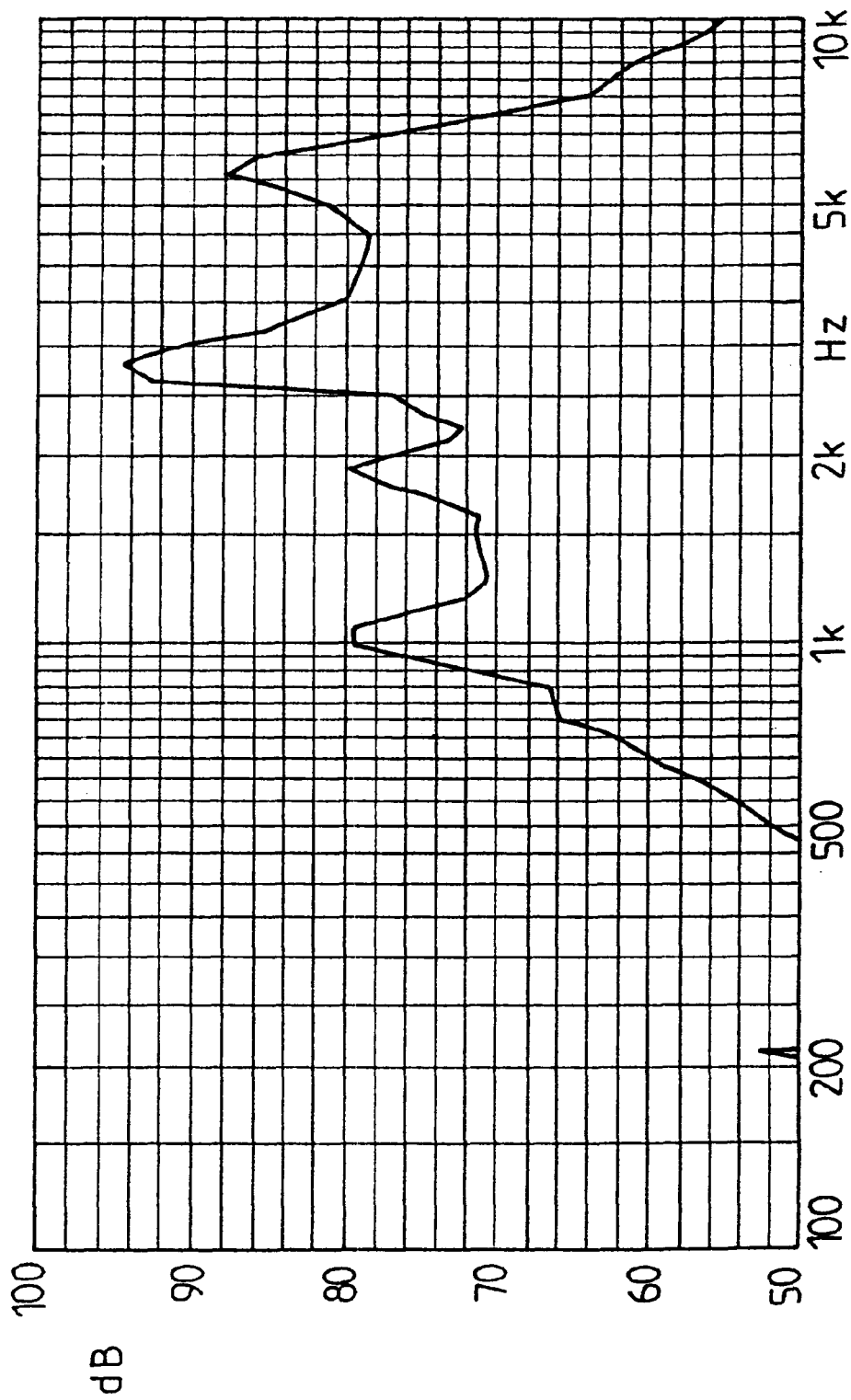
FIG. 2 gives an example of frequency response for the electromechanical transducers as described previously.

In FIG. 2 is shown the sound level of the output of the transducer (expressed in decibels) plotted ant the frequency of the excitation signal of the transducer when operating freely, (that is, without a housing) in normal operating conditions (notably when the duty cycle of the excitation signal is 50%). For frequencies lying between 500 Hz and 10 kHz, the output sound level varies from 50 dB to 95 dB. Such transducers thus do not permit of playing melodies composed of a plurality of notes having different frequencies.

The invention consists of adapting the response of the transducer as a function of the frequency when one seeks to play with a constant sound level.

Figure 3:
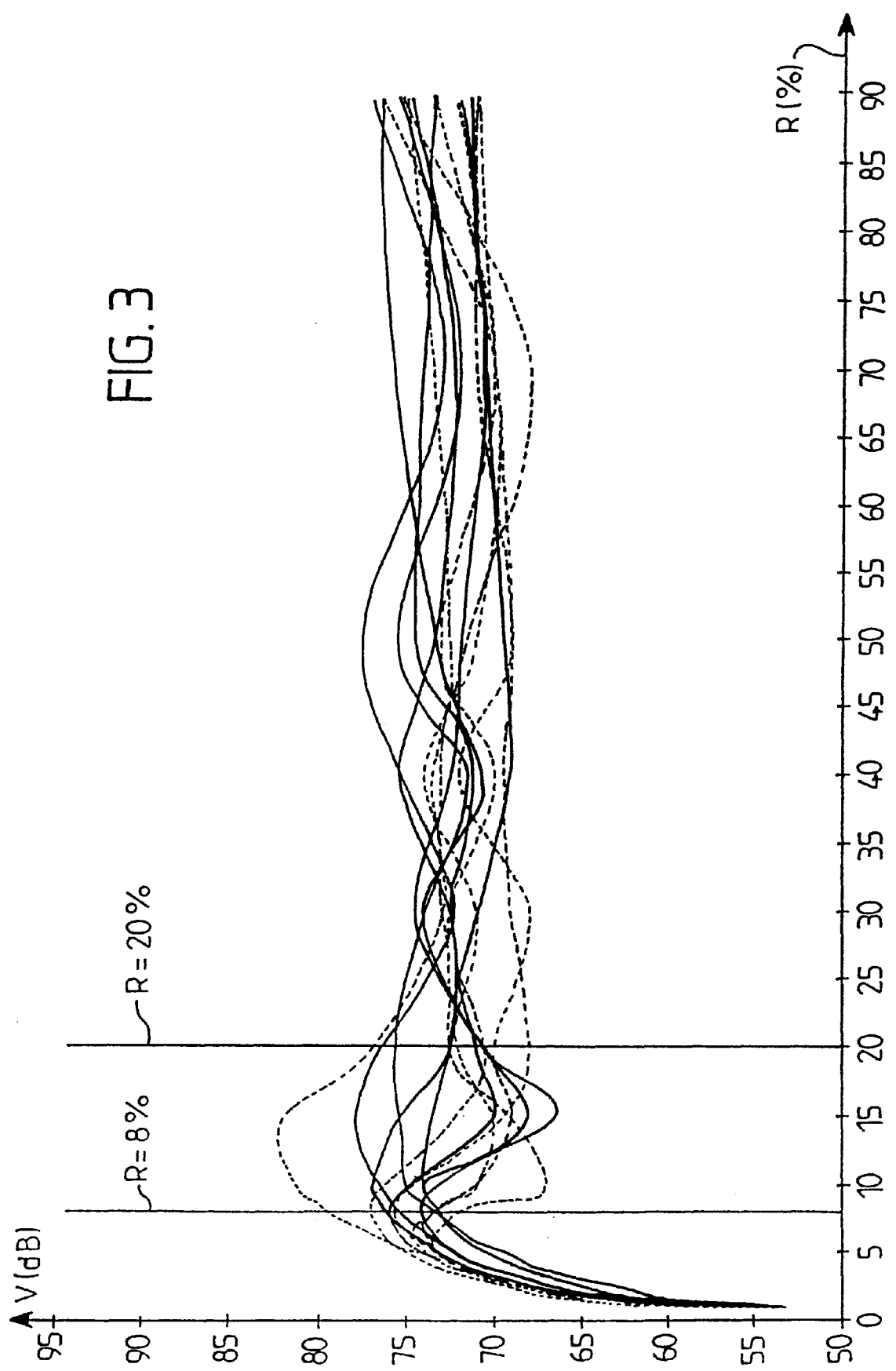
FIG. 3 represents the effect of the variation of the duty cycle of the excitation signal on the sound level produced by the transducer.

The invention is notably based on the following observation: when the duty cycle of the excitation signal I varies between 1% and 8%, the sound level obtained on the output of the transducer proportionally varies with the duty cycle, whatever the frequency under consideration. In FIG. 3 is shown the effect of the variation of the duty cycle of the excitation signal I on the sound level produced by the transducer. It is noted that three zones arise:

a first zone (R lying between 1% and 8%), in which the duty cycle and the sound level are proportional whatever the frequency, a second zone (R lying between 8% and 20%) which is too chaotic to use, a third zone (R higher than 20%) in which the variation of the duty cycle no longer has any influence.

The invention thus consists of associating to each frequency a value of the duty cycle of the excitation signal of the transducer lying between 1% and 8% to obtain a given sound level.

The microprocessor assembly 8 ensures the generation of excitation signals which have variable frequencies and duty cycles. The frequencies which may be generated depend on the clock ($F_{CLK}$) which controls the microprocessor: thus only a certain number of discrete values can be obeyed and not a continuous variation of the frequency. Among the available frequencies a range is selected which permit of playing pieces of music. The level of this range has been chosen for obtaining a satisfactory ease of listening and the frequencies which exert near enough to the musical notes have been retained within this range.

The PHILIPS 91CL301 microprocessor makes it possible to generate the following frequencies $F_i$:$F_i = F_{CLK}/225/(1+x)$ with $F_{CLK} = 19.5$ MHz and $x = 0, \ldots, 255$.

The range [444 Hz→1062 Hz] has been selected for use, the higher ranges not being well adapted from a psycho-acoustic point of view (they are irritating to the user). And in this range, the following frequencies are retained:

TABLE T1

| x | frequency | note (musical frequency) | reference |
| --- | --- | --- | --- |
| 143 | 531 Hz | do (523 Hz) | →4 |
| 131 | 579 Hz | do# (554 Hz) | →5 |
| 127 | 597 Hz | re (587 Hz) | →6 |
| 119 | 637 Hz | mi (659 Hz) | →7 |
| 107 | 708 Hz | fa (698, 5 Hz) | →8 |
| 103 | 735 Hz | fa# (740 Hz) | →9 |
| 95 | 796 Hz | sol (784 Hz) | →A |
| 83 | 910 Hz | la (880 Hz) | →B |
| 75 | 1006 Hz | si (988 Hz) | →C |
| 71 | 1062 Hz | do (1046, 5 Hz) | →D |

In the following of the description, each note is referenced by a hexadecimal digit (in the described example 4 to D in an order of rising frequencies). A Table T1 gives the reference/frequency correspondence for each note.

Table T2 will now be given which shows the correspondence between, on the one hand, the notes and the sound levels V1, V2 or V3 searched for, and, on the other hand, the duty cycle to be used.

TABLE T2

|  | V1 (67 ± 0.5 dB) | V2 (70 ± 0.5 dB) | V3 (73 ± 0.5 dB) |
| --- | --- | --- | --- |
| 4 (do) | 2.5% | 3.66% | 8% |
| 5 (do#) | 3% | 3.66% | 5.33% |
| 6 (re) | 2% | 3% | 4.5% |

TABLE T2-continued

|  | V1 (67 ± 0.5 dB) | V2 (70 ± 0.5 dB) | V3 (73 ± 0.5 dB) |
| --- | --- | --- | --- |
| 7 (mi) | 2.5% | 3.66% | 5% |
| 8 (fa) | 3% | 4% | 6% |
| 9 (fa#) | 3% | 3.66% | 5% |
| A (sol) | 2% | 3.66% | 5.33% |
| B (la) | 3.66% | 5% | 8% |
| C (si) | 2.5% | 3.33% | 5.33% |
| D (do) | 4% | 5.33% | 8% |

For optimizing the necessary memory space 9 for the coding, the melodies are stored in a third Table T3. For each melody this Table sequentially indicates the constituent elements of said melody:

the notes to be played (N) and their duration (D), the silences (S) and their duration (D), the repetitions (R), the number of repetitions (NbR) and the number of lines to be repeated (NbL).

In another embodiment of the present invention, certain of these elements are at least defined inside a window W which has a defined duration. When such a window has been defined, a time delay which corresponds to said duration starts before the elements contained in this window are played. And the contents of the window are played as long as this time delay has not expired.

By way of example, the contents of Table T3 will now be given for the melody M described in FIG. 4.

Figure 4:
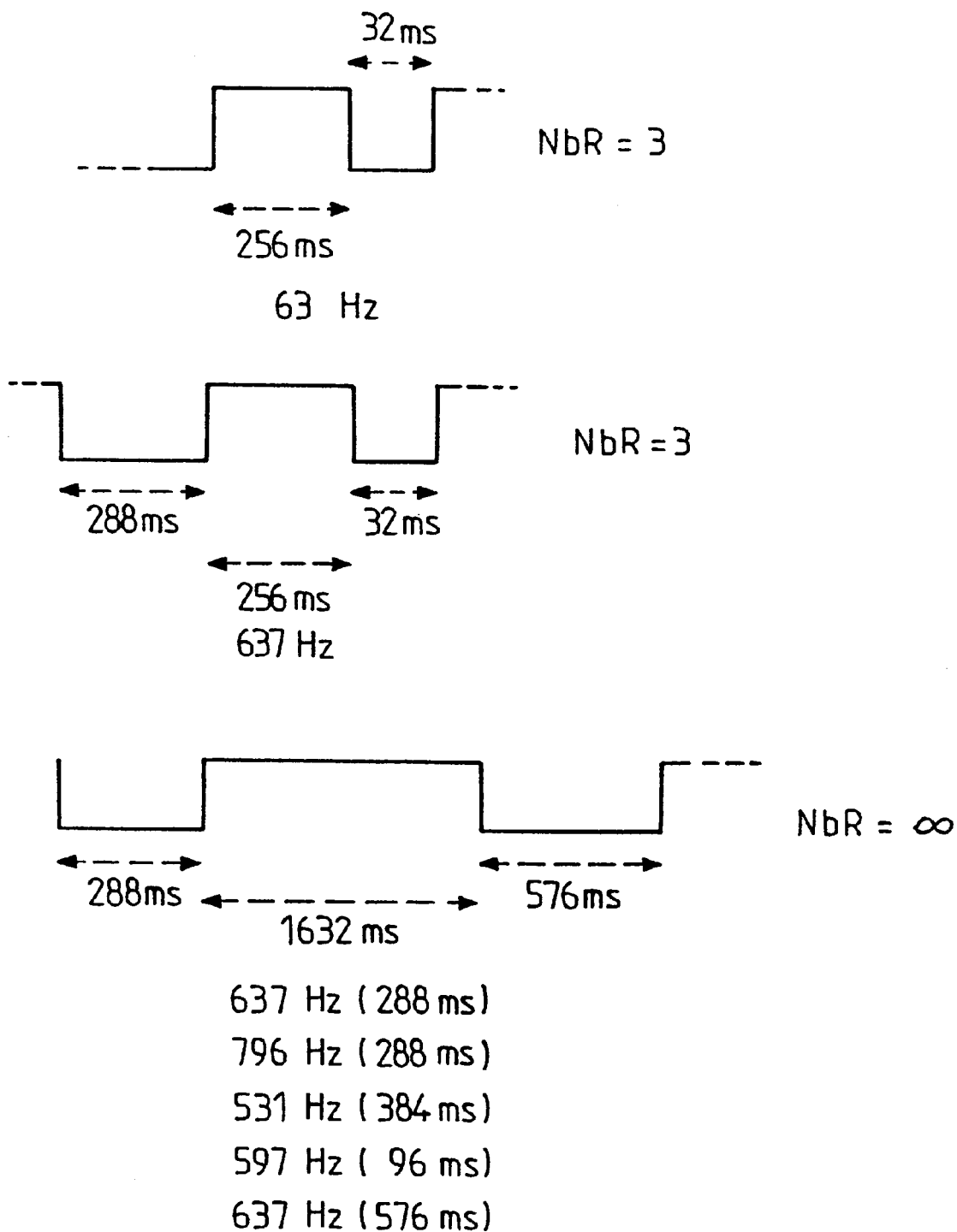
FIG. 4 represents an example of a melody, and FIG. 5 gives an example of an operational flow chart of a method according to the invention which permits of playing melodies.

The melody M shown in FIG. 4 consists of infinitely repeating the following steps:

repeat three times: the note mi (256 ms) followed by a silence of 32 Ms, maintain a silence for 288 ms, repeat three times: the note mi (256 ms) followed by a silence of 32 Ms, maintain a silence for 288 ms, play the note mi (288 ms), the note sol (288 ms), the note do (duration 384 ms), the note re (96 ms) and the note mi (576 ns), maintain a silence for 576 ms.

The contents of the Table T3 at the address of the melody M are thus the following:

TABLE T3

| Melody M → | N (mi) | D = 256 ms |  |
| --- | --- | --- | --- |
|  | S | D = 32 ms |  |
|  | R | NbR = 2 | NbL = 2 |
|  | S | D = 288 ms |  |
|  | N (mi) | D = 256 ms |  |
|  | S | D = 32 ms |  |
|  | R | NbR = 2 | NbL = 2 |
|  | S | D = 288 ms |  |
|  | N (mi) | D = 256 ms |  |
|  | N (sol) | D = 288 ms |  |
|  | N (do) | D = 384 ms |  |
|  | N (re) | D = 96 ms |  |
|  | N (mi) | D = 576 ms |  |
|  | S | D = 576 ms |  |
|  | R | NbR = ∞ | NbL = 14 |
|  | F |  |  |

By way of example, Table T3 may be coded in a hexadecimal code in 4 digits. The first digit indicates that it is a silence (0), a note (4 at D), a repetition (E) or a window (1). For a note or a silence, the next three digits indicate the duration of the note or the silence. For a repetition, the next two digits indicate the number of repetitions and the last digit indicates the number of rows to be repeated in the Table.

All example of the coding of Table T3 for the melody M is given below:

```
begin
    0x7100
    0x0020
    0xE022
    0x0120
    0x7100
    0x0020
    0xE022
    0x0120
    0x7120
    0xA120
    0x4180
    0x6060
    0x7240
    0x0240
    0xEFFE
end
```

The significance of the notion of the window will be understood: in the example which has just been described, the number of repetitions is either infinite (FF) or limited to 254. To obtain a finite number of repetitions higher than 254, a window W of a given duration is thus defined previous to the respective elements.

Similarly, the number of rows that can be repeated is limited to 15. To remedy this drawback, a concept of return to the start of the melody is defined.

Figure 5:
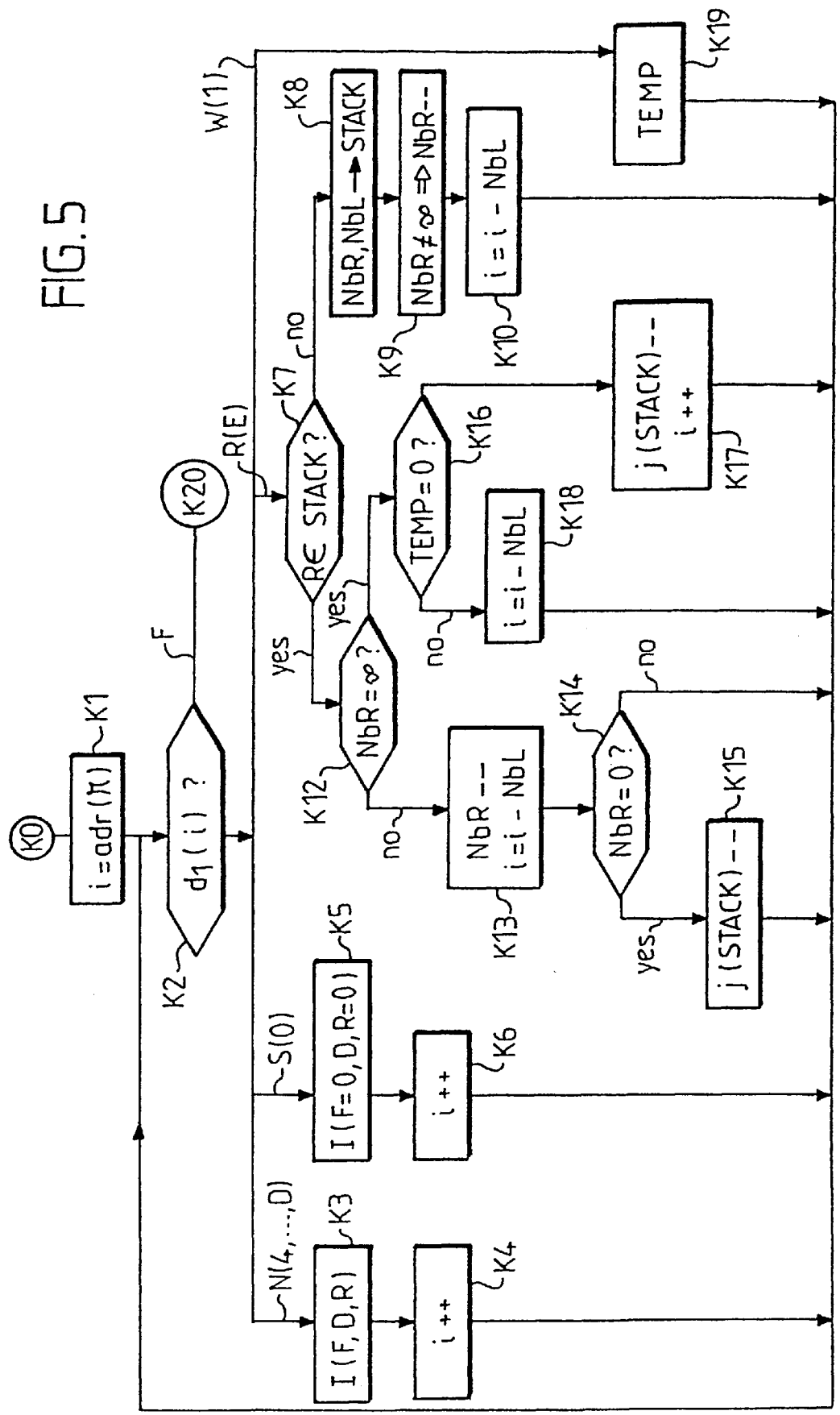

Now an example of an operational flow chart of the processor 8 with respect to the invention will be described with the aid of FIG. 5.

To play the melody M with a sound level V, the processor 8 sequentially reads Table T3. Therefore, in box K1 an index i is initialized at the address adr(M) of the melody M in the Table T3. Then, in box K2, a test is made of the value of the first digit of the row i of the Table T3 (in FIG. 5 this digit is denoted d1). If this digit indicates a note N to be played, the operation is proceeded in box K3. If it indicates a silence S, it is proceeded in box K5, if it indicates a repetition R, box K7 is proceeded to and if it indicates a window, box K19 is proceeded to. Finally, if this field indicates that the melody has finished (F), the operation is terminated in box K20.

In box K3, the variables which indicate the characteristic features of the excitation signal I to be sent to the transducer 6 (frequency F, duration D, duty cycle R) are initialized. The frequency F is read from the Table T1 based on the reference of the note N to be played. The duration for which the signal is to be sent is directly read from the Table T3. And the value of its duty cycle is read from the Table T2 on the basis of the sought sound level V and the note N to be played. The excitation signal I (F, D, R) is sent to the transducer 6, then to box K4, the index i is incremented by unity and the operation is resumed at box K2.

The box K5 deals with the case of silences. The duration D during which the silence is to be respected is directly given by Table T3. An excitation signal I (F, D, R) having a zero frequency and zero duty cycle is sent to the transducer 6. Then, in box K6, the index i is incremented by unity and the operation is resumed at box K2.

Repetitions will be discussed with respect to box K7 to box K15. Thereto, a stack (denoted STACK) in which the characteristic features are stored (number of repetitions NbR and number of rows to be repeated NbL) of each newly found repetition. In box K7 there is verified whether his repetition is a new repetition or whether it is the last repetition stored in the stack, that is to say, the repetition which is being processed. If it is the repetition that is being processed, the operation is carried on in box K12. If it is a new repetition, the operation is proceeded in box K8.

In box K8 the characteristic features (NbR, NbL) of this new repetition are stored in the stack memory. Then, in box K9, if the variable NbR has a finite value, it is decremented by unity. In box K10 the index i is subtracted from the number NbL after which the operation is resumed in box K2.

In box K12 there is verified whether the variable NbR has a new finite value. In that case the operation is proceeded in box K13. If not, it is proceeded in box K16. In box K13 the variable NbR is decremented by unity and the number NbL is subtracted from the index i. Then, in box K14, a test is made whether NbR is equal to zero. In that case, the corresponding row in the stack memory (which is symbolized in box K15 by a decrementation of the current index j (STACK) of the stack memory STACK) by unity, before the operation is resumed at box K2. If not, the operation is directly resumed at box K2.

In box K16 there is verified whether one is inside a window of which the time delay (TEMP) has expired. In that case, (box K17) the row corresponding to the repetition in the stack memory is made free after which the index i is incremented before the operation is resumed at box K2. In the opposite case (box K18), the number NbL is subtracted from the index i before the operation is resumed at box K2.

In box K19 a time delay TEMP is launched. The index i is incremented by unity after which the operation is resumed at box K2.

Obviously, modifications may be made in the embodiment which has just been described by way of example, notably by substituting equivalent technical means without thereby leaving the scope of the present invention.

We claim:

1. A telephone comprising:

a transducer which produces a sound having a level which is a function of frequency and duty cycle of an excitation signal;

a controller for providing said excitation signal having different frequencies, wherein said controller varies the duty cycle so that the level of said sound remains constant at said different frequencies; and a memory for storing values of the duty cycle corresponding to said different frequencies, said values allowing the level of said sound to remain constant at said different frequencies.

2. The telephone of claim 1, wherein said controller codes a melody for producing said sound as said melody.

3. The telephone of claim 1, wherein said controller codes a melody by storing at least one of components of said melody in a table of said memory, said components including notes, silences and repetitions.

4. The telephone of claim 3, wherein said table includes for each of said notes and for each of said silences a duration of said each note or said each silence.

5. The telephone of claim 3, wherein said table includes for each of said repetitions a repetition number for said each repetition and elements to be repeated.

6. The telephone of claim 5, wherein said table further includes for said each repetition a time limit when said repetition number is infinite.

7. The telephone of claim 1, wherein said controller stores a coded melody in a table of said memory and reads said coded melody by sequentially passing through said table from a start of said melody, and effecting returns to play repetitions included in said coded melody.

8. A method of coding a melody having different frequencies in a telephone including the steps of:

producing said melody using a transducer which changes a level of said melody as a function of frequency and duty cycle of said melody;

varying the duty cycle so that the level of said melody remains constant at said different frequencies; and storing notes of said different frequencies and duty cycle values corresponding to said notes, said duty cycle values being chosen to provide said constant level of said melody at said different frequencies.

9. The method of claim 8, further comprising sequentially reading said notes and said duty cycle values for playing said melody.

10. The method of claim 8, further comprising storing silences, repetitions, duration of each of said notes and each of said silences, a repetition number for each of said repetitions, and a time limit when said repetition number is infinite.

11. The method of claim 8, further comprising storing data relating to elements of said melody which are to be repeated.

\* \* \* \* \*